United States Patent [19]
Juba et al.

[11] 3,983,206
[45] Sept. 28, 1976

[54] SEALANT SYSTEM FOR BURIAL VAULT AND METHOD OF APPLICATION

[75] Inventors: Bernard T. Juba, White Bear Lake; James A. Collins, North Oaks, both of Minn.

[73] Assignee: H. B. Fuller Company, St. Paul, Minn.

[22] Filed: Apr. 28, 1975

[21] Appl. No.: 572,113

[52] U.S. Cl. .................................. 264/255; 52/135; 52/141; 260/27 R; 260/33.6 PQ; 264/256; 264/268
[51] Int. Cl.² .................. B32B 13/12; E04H 13/00
[58] Field of Search .......... 264/255, 256, 267, 268, 264/279, 135; 52/135, 140, 141; 260/33.6 PQ, 897 A, 27 R; 156/334; 427/207 A; 428/212, 516, 523

[56] References Cited
UNITED STATES PATENTS

| | | | |
|---|---|---|---|
| 2,018,941 | 10/1935 | Begun et al. | 52/135 |
| 2,027,483 | 1/1936 | Keller | 264/255 |
| 2,265,876 | 12/1941 | Sleichter | 52/135 |
| 3,787,545 | 1/1974 | Chandler et al. | 264/135 |

Primary Examiner—Jeffery R. Thurlow
Attorney, Agent, or Firm—Thomas M. Meshbesher

[57] ABSTRACT

The disclosed heterogeneous hot-melt sealant system is particularly well suited to sealing the typical tongue-and-groove joint between the base and cover of a burial vault. The hot-melt system comprises a plurality of layers, each layer being a distinct phase which resists chemical or morphological penetration (e.g. paraffin oil migration) from the adjacent layer. The layers are typically applied to the groove in the cover for the vault by individual casting or pouring of each of a plurality of hot-melt compositions in the molten state. Each hot-melt composition comprises an essentially amorphous polypropylene, a hydrocarbon resin (e.g. synthetic terpene resin), and a hydrocarbon (e.g. paraffin) oil. The first (bottom) poured hot-melt contains more polypropylene and less oil and terpene resin than the second (upper) pour. The plurality of layers co-operate to provide a variety of properties including fast sealing (even at low temperatures) and low temperature flexibility (primarily contributed by the upper pour) and good long-term hydrostatic pressure resistance (primarily provided by the bottom pour).

12 Claims, No Drawings

SEALANT SYSTEM FOR BURIAL VAULT AND METHOD OF APPLICATION

FIELD OF THE INVENTION

This invention relates generally to the technology of burial vaults. An aspect of this invention relates to a method for providing a deformable sealing member adhered to a major structural element (e.g. the lid or closure means) of the burial vault. Another aspect of this invention relates to the technology of forming in place a peripheral sealant means from a hot-melt composition, the sealant means being adapted or constructed and arranged to provide a pressure- and water-resistant seal around the periphery of a burial vault, e.g. the portion where the closure means rests upon or engages the box or base structure of the vault. Still another aspect of this invention relates to the technology of sealing a concrete burial vault, e.g. a lid or closure and box or base combination, these major structural elements of the burial vault being formed from concrete or the like, with or without plastic inner walls or liners. Still another aspect of this invention relates to manufacture of a concrete burial vault closure or cover including the step of providing a thermoplastic sealing element around the periphery of the underside of the cover.

DESCRIPTION OF THE PRIOR ART

It is a common practice to construct burial vaults from materials such as concrete. In some prior art burial vault structures, the concrete can be lined with a plastic inner wall or liner adhered to the inner surfaces of the cover and the box portion of the vault. For a description of a variety of typical burial vault structures, see U.S. Pat. No. 3,439,461 (Chandler et al), issued Apr. 22, 1969, and U.S. Pat. No. 3,787,545 (Chandler et al), issued Jan. 22, 1974.

Despite the great weight of the cover or closure or lid element of a typical concrete burial vault (e.g. 500–1,000 pounds or about 230–450Kg), the sealing relationship between the cover element and the box element is not water tight—unless, of course, a suitable sealant is provided for the periphery of the cover and/or the box.

One sealant material used in the past was asphalt. Generally speaking, asphalt was found to be too soft at elevated temperatures (which can occur during hot summer days) and too hard at winter temperatures. Furthermore, solvent or solvent-like materials contained in asphalt can attack plastic liners. For example, one typical liner or inner wall material for some concrete vaults comprises polystyrene, which is attacked or solvated by aromatic materials in typical asphalt compositions.

In recent years, synthetic sealant materials of the hot-melt type have been accepted in the burial vault manufacturing industry. Not only do these synthetic materials have better overall properties than asphalt, they are also less likely to attack polystyrene liners and the like. (Attempts have been made to improve asphalt seals by pouring two-phase asphalt systems, but these hot-melt sealants are still the materials of choice in the industry.)

A typical commercial burial vault sealant material avalable from H. B. Fuller Company of St. Paul, Minnesota, is commercially designated "J 4086" and consists essentially of 45% amorphous polypropylene, 27.5% synthetic terpene resin ("Wingtack 95" trademark of Goodyear Chemical Company), and 27.5% paraffin oil. This formula meets many of the requirements for a good burial vault sealing compound, that is:

1. It is readily pourable and self-leveling at temperatures which are high enough to avoid flow or drip under the influence of gravity at temperatures below 140°F. (60°C.) but low enough (e.g. below 120°C.) to avoid thermo-attack upon polystyrene plastic liners.

2. The sealant does not affect the properties of the plastic liner, even after prolonged periods of contact between the sealing compound and the plastic liner. (It must be remembered that burial vaults are intended to last almost indefinitely.) Furthermore, the properties of the sealing compound do not change significantly with age.

3. The sealant is essentially inert to water and soil conditions and can resist ingress of water under a variety of temperature conditions and hydrostatic pressures ranging up to about 3 or 4 p.s.i.g. (the equivalent of the hydrostatic head of a typical burial depth). (If multiple-depth burial is used a seal resistant to 6 p.s.i.g. or more may be needed.)

Despite the tremendous advance in the art provided by this type of thermoplastic sealing compound, a number of particularly troublesome problems in the burial vault sealing art remain to be solved. For example, under extremely severe winter weather conditions, the sealant member may be cooled to the point where it is near or even below its glass transition temperature, resulting in excessive brittleness and a loss of sealant properties. As is known in the art, the glass transition temperature can be manipulated by changing the amounts of ingredients in the hot-melt composition; however, this type of manipulation poses a dilemna; if the glass transition temperature is too high, not only may brittleness result at very low temperatures, there is also the risk that even the great weight of the concrete cover will not be sufficient to bring about (except very slowly) a suitable sealing effect. The optimum sealing member would be readily deformed by simple pressure resulting from the weight of the concrete cover, even under winter weather conditions.

Given the present state of the art, there does not appear to be any way to have one's cake and eat it too—that is, to have one's readily deformable, fast-sealing, cold-weather-resistant cake—without running the risk of inadequate resistance to hydrostatic pressure, inadequate flow or drip resistance, etc.

SUMMARY OF THE INVENTION

It has now been found that a heterogeneous sealant system appears to provide a performance which can satisfy all of the previously described criteria of a burial vault sealant. This invention generally involves a first hot-melt phase with a first low glass transition temperature and a second-hot-melt phase with a much lower glass transition temperature. The two phases cooperate in a manner which appears to be superior to any single-phase composition, but, surprisingly, under both the conditions of forming the sealant member and the condition of use, the two phases resist intermingling and retain their separate sets of physical properties.

In the present state of the hot-melt art and the thermoplastic resins art, it is not ordinarily possible to predict which types of gel structure will retain a plasticizing or softening material within itself and prevent migration of this softening or plasticizing material into adjacent environments. It is believed to be particularly difficult to predict what the resistance to migration will be when a heterogeneous system made up of two or more hot-melt compositions of great chemical similarity is formed and used. In the preferred practice of this invention, a first hot-melt is poured into the peripheral recess or groove of an inverted burial vault cover and permitted to seek its own level and solidify. A second hot-melt is then poured into adherent contact with the first. Both hot-melts can be identical except for their physical properties (e.g. glass transition temperature) and the proportions of ingredients used to make them. That is, the same plasticizing and/or softening materials (such as hydrocarbon oils and tackifying or hydrocarbon resins) can be and preferably are present in both laminae or phases. In use, the two phases are placed under stress provided by the 500–1,000 pound weight of the concrete cover. Yet, for reasons which are not readily apparent, intermingling of the phases and blurring of the distinctions in physical properties between the two phases does not occur. Although this invention is not bound by any theory, it is presently believed that the peculiar gel structure of each phase helps to preserve individual phase identities.

Stated very simply, this invention involves a method for providing a solid, gel-like thermoplastic sealant member in operative adherent contact with at least the periphery of a major structural element of a burial vault, and the method includes the steps of:

a. pouring the first hot-melt into place in the groove of the structural element,
b. permitting this first hot-melt which has been thus poured to seek its own level and to solidify,
c. pouring a second layer comprising a second hot-melt composition into adherent contact with the top of the first layer.

Both hot-melt compositions are substantially solid at temperatures below 60°C.; both are pourable and capable of seeking their own level at temperatures within the range of about 85°–120°C.; and both are comprised of substantially amorphous polypropylene, hydrocarbon resin, and hydrocarbon oil. The first hot-melt can comprise 45–70% by weight of the substantially amorphous polypropylene, 15–25% by weight of the hydrocarbon resin, and 15–25% by weight of the hydrocarbon oil, thereby providng a glass transition temperature within the range of −20°C. to 0°C. The second hot-melt has a much lower glass transition temperature ($T_g$), preferably in the range of −45°C. to −25°C. To provide this lower $T_g$ less polypropylene is used (30–42% by weight), and the proportions of hydrocarbon resins and hydrocarbon oils are 20–30% by weight and 25–45% by weight respectively.

The result is a heterogeneous sealant member with a plurality of cooperating but distinct phases. The cooperation between the soft deformable second hot-melt and the tougher, more pressure resistant first-hot-melt makes for rapid sealing under a wide variety of temperature conditions, yet the resulting seal can resist, at 24°C., a hydrostatic head in excess of 275 cm.

If the groove is in the box member or a pre-formed liner, instead of the cover member, the sequence of steps is still substantially the same.

DETAILED DESCRIPTION

A number of aspects of the burial vault sealing art are well known to those skilled in the art and need not be described in detail with respect to the vault structure itself. The major structural elements include a cover (i.e. lid or closure) a box or base, and one or more liner elements, if the cover or box is lined). For example, a typical burial vault structure comprising major elements (cover, box and liners) is disclosed in U.S. Pat. No. 3,439,461 (Chandler et al) issued Apr. 22, 1969; see, for example, FIGS. 6, 7, and 8. The burial vault illustrated in the Chandler et al patent is provided with a plastic liner. However, as is well known in the art, the liner can be omitted and unlined concrete can be used for the major structural elements of the vault. As will be readily apparent from FIGS. 6, 7, and 8 of Chandler et al, the cover unit (i.e. the concrete closure or lid) is provided with a peripheral groove. This groove is a recess means for receiving the peripheral tongue or shoulder means on the top of the box or base portion of the vault, so that a tongue-in-groove joint can be formed when the closure or lid is placed upon the base. More important, from the standpoint of this invention, the groove is a means for receiving deformable sealant material, so that the tongue-in-groove joint will seal off the interior of the vault from damaging or corrosive materials in the environment of the grave, e.g. water and soil. Although the tongue-in-groove seal could be the other way around (i.e. tongue on the lid and a groove in the top of the box), the preferred industrial practice is to cast the lid or closure means with a peripheral groove in it. Accordingly, for convenience of description, it will be assumed that the conventional tongue-in-groove arrangement is used.

Various techniques of pouring molten materials into the peripheral groove are also well known and need not be described in detail. Typically, the sealant or sealing compound poured into the groove is molten. As soon as the molten material comes in contact with the groove, it is immediately provided with a large heat sink, i.e., a 500–1,000 pound mass of lined or unlined concrete. The heat sink effect produces rapid cooling of the molten material, so that the temperature of the poured sealant member quickly drops below 60°C. or even down to room temperature. The result is a concrete lid or closure means with a built-in sealant member which can be activated, so to speak, by the stress produced when the groove is placed onto the tongue of the base. Under the weight of the concrete (or essentially concrete) lid, cold flow of the sealant can take place, resulting in conformity of the sealant member to the operative surfaces of the tongue-in-groove joint.

As described previously, it is also known in the art to select materials which can deform or cold flow even under relatively low temperature conditions, e.g. temperatures in the range of about −30°C. to 0°C. However, the better the cold flow at low temperatures, the greater the danger of premature deformation or flow of the sealant member prior to placement of the lid or closure; however, if the sealant member is too hard to permit rapid penetration by the tongue of the vault, there is also a danger of immediately permitting the ingress of water when the vault is lowered into grave, should it be filled or partially filled with water. In the prior art of burial vault sealing, attempts have been made to pour two-phase asphalt sealants which, through cooperation of the two phases, would provide suitable cold flow resistance under hot weather conditions or shipping and storage conditions wherein the temperature rises considerably above normal room temperature. Thus, there has already been some experience in the art with pouring and formation of heterogeneous sealing members for burial vaults. These heterogeneous asphalt sealant members, it should be noted, lacked the distinctness between phases which characterizes this invention. Migration of lower molecular weight materials from one asphalt layer or phase to another can and does occur, thus interferring with the possibility of providing cooperation between a soft, rapidly deformable layer and a tough back-up layer. It should also be noted that the cold flow property described previously is an important feature of any burial vault sealant member. The sealant member has to serve as a sort of gasket. It is difficult to cast the concrete lid and box with sufficient precision to provide tongue-in-groove surfaces which interlock perfectly. A purpose of the sealant is to flow into irregularities and provide a uniform sealing effect. Non-uniformity in the sealant material itself can lead to improper mating of the tongue and groove at one or more places along the periphery of the joint, creating a wobble in the lid which is tantamount to a leaky seal. Providing a sealant member with the requisite uniformity as well as cooperation of heterogeneous phases is one of the important goals of this invention.

The materials used in the preferred hot-melt composition of this invention will now be described in detail:

The First (Hydrostatic Pressure-Resistant) Hot-Melt Composition

In the method of this invention, the first layer poured into the groove is tacky at moderately elevated temperatures and mobile in the molten state, so that it can flow into operative adherent contact with the bottom and sides of the groove. Being in the molten state, the poured hot-melt quickly seeks its own level and forms a generally planar upper surface. In other words, this first layer of hot-melt composition, though its purpose is to cooperate in the sealing action of the ultimately obtained sealing member, could be characterized as a hot-melt adhesive. Like other hot-melt adhesives, it may or may not be tacky at room temperature, depending upon the amount or tackifier, softener, or plasticizer, etc., which is used to ensure tack at temperatures above 60°C.

An important function of the first layer of hot-melt is to provide long-term permanence for the tongue-in-groove joint, good flow or drip resistance when exposed to sunlight during warm summer weather (or excessively warm storage conditions prior to installation or use with the box portion of the vault) and good resistance to hydrostatic pressure. A good burial vault seal should resist ingress of water under all temperature conditions up to a pressure of about 4 p.s.i.g. (about 2800 Kg/m$^2$), corresponding to a hydrostatic head of about 275 cm. (about 9 feet). In multiple depth burial, hydrostatic pressures up to 6 p.s.i.g (about 4200 Kg/m$^2$) are fairly common. In some instances, burial depths up to 5 to 6 meters have been used, and engineering safety factor considerations make a strong case for a seal which will resist a hydrostatic head of at least 5 meters and preferably 6 meters, at least when tested at 24°C. The goal in this art is to provide an essentially permanent seal—failures or leaks which might be permissable in other arts can be an anathema in the burial vault art. Accordingly, it is preferred to select a first or bottom-pour hot-melt adhesive with the ability to withstand 8 p.s.i.g., or even 10 p.s.i.g. (at least about 5600 Kg/m$^2$ and preferably at least about 7000 Kg/m$^2$) at various temperatures.

This hydrostatic pressure resistance is preferably achieved without sacrificing the pourability of the hot-melt adhesive in the range of 85°–120°C., more preferably 90°–110°C. If the pour temperature is above the preferred range, the hot-melt may be limited to use with unlined concrete structures. If the pour temperature can be below the preferred ranges, there is a substantial risk that the properties under conditions of use will be inadequate. For example, a hot-melt composition which was not substantially solid at temperatures below 60°C. could have totally unsuitable properties at room temperature or at even lower temperatures.

Among the physical properties desired for the first or bottom pour of hot-melt are the following:

|  | Broad | Preferred | Optimum |
|---|---|---|---|
| Glass Transition Temperature ($T_g$) | −20°C to 0°C | −15°C to −5°C | −8°C to −10°C |
| Penetration (ASTM, D-217-T60)* | <350 mm. | <300 mm. | 100–200 mm. |
| Drip & Flow Resistance (under influence of gravity) at: | <60°C. | <65°C | <72°C. |
| Pourable in the temperature range of: | 85–120°C | 90–110°C | 200–220°F (93–105°C) |
| Simulated Penetration test 25°C./800 lbs./0.5″ depth of pour | — | 0.25″ in <6 min. | 0.25″ in <4 min. |
| Simulated Penetration test 10°F. (−12.2°C.)/800 lbs./0.5″ depth of pour | — | 0.5″ in <120 min. | 0.5″ in <90 min. |

*American Society for Testing and Materials, test number D-217-T60 for penetration with D-5 needle in 5 seconds at 25°C. under 200 grams of weight.

The ASTM D-217-T60 needle penetration test is believed to provide a good index of hardness or softness of the hot-melt material at room temperature. The simulated penetration test described in the above table is intended to more closely resemble actual conditions of use. In this practical test, the material is poured into a groove provided by a piece of shaped plastic. A second piece of sheet plastic formed into the shape of a tongue member is placed on top of the upper surface of the solidified pour. The resulting tongue-in-groove joint is then subjected to a pressure which simulates the total force exerted by the mass of a cover weighing 700 to 900 pounds. The effect is very much like observing, in cross-section, the actual operation of a sealing member while it is deformed in place by the weight of the burial vault lid, thereby sealing the tongue-in-groove joint between the lid and the box.

As pointed out previously, the first layer poured in the practice of this invention comprises a hot-melt composition. As is known in the art, a "hot-melt composition" is thermoplastic in nature and is capable of changing to a mobile liquid and flowing under its own weight at temperatures above, for example, 85°C. In other words, this mobile liquid is pourable and capable of seeking its own level at such moderate elevated temperatures. Furthermore, a "hot-melt composition" can be subjected to the cycle of melting/solidification several times without adverse affects. More important for the purposes of this invention, the composition can be cycled above and below the glass transition temperature virtually indefinitely without adverse effects upon the physical properties of the composition.

"Hot-melt" materials and compositions of various types are well known in the plastics and adhesives arts and are used as coating, bonding, and sealing materials. A typical "hot-melt" composition comprises one or more high molecular weight polymers to give strength and flexibility to the formulation; lower molecular weights, resins, oils, and plasticizers, or the like, which act as viscosity depressants or stabilizers, flexibilizers, etc.; and various other conventional ingredients (not ordinarily required in the context of this invention) such as waxes, fillers, anti-oxidants, pigments, anti-skinning agents, slip agents, etc. In the preferred practice of this invention, the "hot-melt" need contain only three essential ingredients: substantially amorphous polypropylene, a hydrocarbon resin, and a hydrocarbon oil (preferably a high molecular weight hydrocarbon oil consisting essentially of paraffins as opposed to aromatics).

Polypropylene is a polyolefin which can have varying degress of crystallinity. One fairly reliable indicator of crystallinity is the softening point. The greater the crystallinity, the more the softening point or softening range approaches the crystalline melting point of 167°C. The greater the amorphous character, the more the softening point diverges from the melting point. A polypropylene with too much crystallinity and/or stereo-regularity will not have the desired compatability relationship with the other ingredients of the composition and will not impart the desired physical properties to the composition. For example, a grade of "atactic" polypropylene containing even a few percent crystallinity can gel at temperatures as high as 100°C., even in the presence of diluents. Furthermore, small amounts of crystallinity can cause "mud cracking" when the material cools after pouring. Many grades of so-called "atactic" polypropylene are available in the molecular weight range of 2,000–20,000 and may be predominantly amorphous but can contain some stereoregular (e.g. isotactic) polypropylene and can still have too much crystallinity. It is therefore preferred that the "atactic" polypropylene be substantially or essentially amorphous; that is, the grade of "atactic" polypropylene should be one for which an effort has been made to separate out crystalline polypropylene, leaving only those incidental and unintended amounts of crystalline polymer which cannot or are not conveniently removed by the separation process. Such amorphous polypropylene materials are available commercially in the 2,000–20,000 molecular weight range, e.g. an average molecular weight in the 2,000–5,000 range. An example of such a commercial material is the "M 5 L" grade atactic polypropylene manufactured by Eastman Chemical Company, which is believed to be essentially free of isotactic polypropylene and to have an average molecular weight of approximately 3,000. This grade of polypropylene has no adverse effect upon pourability at the pour temperature and is resistant to cracking and crazing when exposed to a variety of weather conditions.

The second resinous component of the hot-melt is a hydrocarbon resin. In industrial practice, "hydrocarbon resin" is a term of art relating to resins in the molecular weight range of a few hundred up to about 6,000 or 8,000 which are obtained or synthesized from rather basic hydrocarbonaceous materials such as petroleum, coal tar, turpentine, and the like. A good description of "hydrocarbon resins" can be found in Kirk-Othmer, Encyclopedia of Chemical Technology, Second Edition, Volume 11, InterScience, New York, 1966, page 242 et seq. Many of the so-called "hydrocarbon resins" commercially available today, are "terpene resins", i.e. polymers with repeating terpene units. These polymers can be homopolymers, or copolymers (including terpolymers, etc.), since terpene is an olefin which can be copolymerized with other olefins. Terpene-phenols are also produced.

All hydrocarbon resins do not work with equal effectiveness, and a commercially available resin known as "Wingtack" 95 (trademark of Goodyear Chemical Company) is especially suited to use in this invention. This hydrocarbon resin is compatible with amorphous polypropylene and has a softening point (ball and ring method) of 100°C. ±5°C. "Wingtack" 95 is believed to be a by-product of isoprene or polyisoprene production and is also believed to be a synthetic terpene resin derived from a mixed olefin feedstock.

The third component of the hot-melt is a heavy hydrocarbon oil, preferably "paraffinic" oil such as "Rubrex" 150 (trade-mark of Mobil Oil Company). In industrial practice, a "paraffin" or "paraffinic" oil can contain less than 100% paraffins. In any event, however, such oils are predominantly paraffinic and are very low in aromatic content. (An aromatic hydrocarbon oil would not be preferred, since it could have a solvating effect upon a plastic burial vault liner.)

A first pour sealing compound of this invention has the following composition:

|  | Broad (% by weight) | Preferred (% by weight) | Optimum (% by weight) |
| --- | --- | --- | --- |
| Amorphous polypropylene, softening point (ball and ring) within the range of 90–105°C. | 45–70 | 55–65 | 60 |
| Hydrocarbon resin ("Wingtack" 95, tm | 15–25 | 15–25 | about 20 |

|  | Broad<br>(% by weight) | Preferred<br>(% by weight) | Optimum<br>(% by weight) |
|---|---|---|---|
| Goodyear Chemical Co.) | | | |
| Hydrocarbon Oil<br>(Preferably paraffinic) | 15–25 | 15–25 | about 20 |

The Second (Fast-Sealing) Hot-Melt Composition

This second hot-melt layer is typically poured into adherent contact with the first layer. While intervening layers of other materials can be used, a very simple two-layer system is fully adequate and is easier to form in place than a multi-layer system. If a multi-layer system is used, the uppermost layer (the layer which first comes into contact with the tongue of the tongue-in-groove joint) is perferably the softest, most deformable layer.

This second layer can comprise exactly the same ingredients as the first layer; however, the proportions of ingredients and the resulting physical properties are different. For example, greater softness and deformability is provided by using less polypropylene (as compared to the first layer) and more hydrocarbon resin and hydrocarbon oil. Thus, the second hot-melt adhesive can have the following composition:

that a soft upper layer and a harder back-up layer, in combination, can provide a water-tight seal in less than 6 minutes after placing the cover or lid on the box at an outdoor temperature of 10°F. (about −12° or −13°C.). Furthermore, the grave could be full of water and the two-phase sealing compound of this invention would still provide a water-tight seal. In short, ordinary winter weather conditions should pose no problem for the heterogeneous sealant system of this invention. In the spring following a winter burial, warmer temperatures would soften the upper (softer) phase of the seal. However, by this time, the back-up layer would be providing an effective seal—a seal resistant to a hydrostatic head of more than 275 cm. or even more than 500 cm. In short, a sealant system of this invention is particularly well designed to deal with the elementary fact that burials (except in frozen tundra regions) can take place at any time of the year and under any weather conditions.

|  | Broad<br>(% by weight) | Preferred<br>(% by weight) | Optimum<br>(% by weight) |
|---|---|---|---|
| Amorphous polypropylene, softening point (ball and ring) within the range of 90–105°C. | 30–42 | 35–40 | about 35 |
| Hydrocarbon resin (Wingtack 95) tm of Goodyear Chemical Co. | 20–30 | 25–30 | 27–28 |
| Hydrocarbon oil (preferably paraffinic) | 25–45 | 35–40 | 37–38 |

The physical properties of the second hot-melt layer are given below:

|  | Broad | Preferred | Optimum |
|---|---|---|---|
| Glass Transition temperature ($T_g$) | −45°C to −25°C. | −45°C to −35°C | −43°C to 40°C |
| Penetration, ASTM Test D-217-T60* | >350 mm. | >400 mm. | 425–475 mm. |
| Pourable at | 85–120°C | 90–110°C | 200–220°F (93–105°C) |
| Drip and Flow resistance (under influence of gravity) at: | <60°C | <65°C | <72°C |
| Simulated Penetration Test 25°C/800 lbs./0.5″ pour depth | — | 0.5″ in 60 sec. | 0.5″ in 5 seconds |
| Simulated Penetration Test 10°F/800 lbs./0.5″ pour depth | — | 0.125″ in 3 min. | 0.125″ in 1 minute<br>0.1875″ in 3 minutes<br>0.25″ in 6 minutes<br>0.5″ in 13.5 minutes |

*American Society for Testing and Materials, test number D-217-T60 for penetration with D-5 needle in 5 seconds at 25°C. under 200 grams of weight.

The practical simulated penetration test (described previously in connection with the first layer) indicates The second layer of hot-melt adhesive adheres firmly to the first layer as well as the walls of the groove (regardless of whether or not the groove is lined). The second layer is, like the first layer, tacky at temperatures above 60°C. and may also be tacky even at room temperature. However, the entire sealant member adheres well to the groove, remains in place, and does not drip or flow out while the cover or lid is stored or shipped, even under hot summer weather conditions.

THE METHOD

Most of the details of the method of this invention will be readily apparent from the preceding discussion. In the preferred method, a concrete closure means for the burial vault is cast on a suitable mold form, so that a peripheral recess means or groove is provided around the underside of the closure. After the concrete has hardened, the closure element may or may not be lined, e.g. with high impact polystyrene, or other materials, including metals as well as plastics.

The hardened closure means is inverted so that the bottom of the groove faces upwardly. The groove or recess is now in position for pouring. The first pour is the hot-melt which is relatively higher in amorphous polypropylene. The hot-melt flows into an adherent operative relationship with the groove, seeks its own level, and solidifies in seconds or minutes. A gel-like layer with a generally planar surface results. The groove is now ready for the second pour.

The hot-melt used in the second pour (or subsequent pours, if any) is the relatively softer material containing less polypropylene. This material flows into adherent operative relationship with the first layer, seeks its own level and quickly solidifies (also in seconds or minutes). The second layer is thus firmly adhered to the first layer as well as the sides of the groove.

Since subsequent pourings or layers are optional, the concrete lid or closure means contains a fully operative sealing member upon cooling of the second pour.

When the method of this invention involves applying the sealant member to a lined cover or closure, it is not necessary that the liner be attached to the cover before pouring the hot-melt. One practice commonly used in the art for plastic (e.g. polystyrene) liners for covers is as follows:

1. The pre-formed plastic or metal liner by itself (i.e. before attachment to the concrete closure) is inverted so that the groove formed in the liner can receive a sealant pour. (The groove can be held in the proper position by weights or clamps.)
2. The sealant is poured. (The sequence of pouring steps of this invention can be used in place of the usual single hot-melt pour.)
3. The liner, thus provided with the sealant member in the groove is inverted and placed upon the mold of the type described in FIG. 19 of Chandler et al, U.S. Pat. No. 3,439,461. From this point forward, the sequence of steps can be as described in the U.S. Pat. No. 3,439,461, i.e. the adhesive can be applied to the upward-facing surface of the liner, the concrete can be poured to form the cover unit or closure, and the resulting cover unit can then be stored for shipment or use. During storage, curing of the concrete and the adhesive can be completed.

The following non-limiting example illustrates the principle and practice of this invention.

EXAMPLE

A 30 inch by 86 inch rectangular concrete cover unit (i.e. closure) for a burial vault was inverted in the usual fashion so that the groove was facing upwardly. The following molten hot-melt composition was poured into the groove to a depth of 0.5 inches:

| Ingredient | Parts by Weight |
| --- | --- |
| "M 5 L" grade atactic polypropylene (trade designation of Eastman Chemical)* | 60 |
| "Wingtack" 95 (trademark of Goodyear Chemical Company for hydrocarbon resin) | 20 |
| Paraffinic Oil ("Rubrex" 150, trademark of Mobil Oil Company) | 20 |

*Amorphous polypropylene with a molecular weight of approximately 3,000 and a softening point (ball and ring method) of 92°C.

The pour temperature was within the range of 200°–220°F. Precise control of the pour temperature is neither practical or necessary so long as it is within the desired range.

After solidification of the first hot-melt layer, the second hot-melt was poured also to a depth of 0.5 inches, bringing the total depth of the sealing compound in the groove to 1.0 inch. The pour temperature was again within the range of 200°–220°F.

The composition of the second hot-melt was as follows:

| Ingredients | Parts by Weight |
| --- | --- |
| "M 5 L" grade atactic polypropylene (trade designation of Eastman Chemical)* | 35 |
| "Wingtack" 95 (trademark of Goodyear Chemical Company for hydrocarbon resin) | 27.5 |
| Paraffinic Oil ("Rubrex" 150, trademark of Mobil Oil Company) | 37.5 |

*Amorphous polypropylene with a molecular weight of approximately 3,000 and a softening point (ball and ring method) of 92°C.

The harder, first-poured sealing compound described above was found to have a glass transition temperature of 16°F. The softer, second-poured sealing compound described above was found to have a glass transition temperature of approximately −45°F.

Penetration values (ASTM test D-217-T60, D-5 needle, 200 grams of weight, 5 seconds, at 25°C.) were as follows:

First (harder) pour: 140±20 mm.
Second (softer) pour: 450±20 mm.

The cover unit thus provided with the sealant member was stored at a temperature below 32°F. (0°C.) for an overnight period and placed on the base (box) at an ambient temperature of 42°F. (5.5°C.). Penetration by the tongue into the 0.5 inch second hot-melt layer to a depth of approximately 0.25 inch was obtained within 1 minute. The covered vault was then placed in a test tank which was filled with water. The water temperature was 50°F. (10°C.) and the water depth was maintained constant so as to maintain a guage pressure at the seal level of 1.75 p.s.i.g. The cover settled roughly another 0.25 to 0.30 inch all around its periphery before filling of the tank was completed. After 20 days under water, the cover had settled a distance of 0.42 inch (into the second layer) based on water replacement calculations. No ingress of water into the interior of the vault occured during the test.

Small amounts of pigment can be added to either of the hot-melt compositions of this Example with no adverse effect. When the two layers are different colors, a well-defined interface line between the two layers is clearly visible. In tests simulating conditions of actual use (wherein the two layers are deformed under pressure equivalent to an 800 pound force in such a manner that a cross-section of the sealant member can be observed), the clear definition of the interface line does not appear to change. These tests strongly suggest that chemical or solute or solvent migration or penetration or morphological alteration of adjacent layers resulting from such migration or penetration does not occur to any significant extent. Cold flow of the layers caused by physical penetration of the weighted groove, on the hand, is extensive. This cold flow, in short, does not appear to alter the distinct phase relationship between layers.

What is claimed is:
1. A method for providing a solid, gel-like thermoplastic sealant member in operative adherent contact with at least the periphery of a major structural element of a burial vault, wherein said major structural element includes a recess means for receiving sealant material, said method comprising:
 a. pouring a first layer comprising a first hot-melt composition into said recess means, said first molten hot-melt composition being substantially solid at temperatures below 60°C., being pourable and capable of seeking its own level at temperatures within the range of about 85° to about 120°C., being comprised of 45 to 70% by weight substantially amorphous polypropylene, 15 to 25% by weight terpene resin, and 15 to 25% by weight essentially paraffinic oil, and having a glass transition temperature within the range of −20°C. to 0°C.;
 b. permitting the said first hot-melt composition which has been thus poured to seek its own level and to solidify;
 c. pouring a second layer comprising a second hot-melt composition into adherent contact with the top of said first layer, said second hot-melt composition having essentially the properties of said first hot-melt composition described in paragraph (a), except for the glass transition temperature, which is in the range of −45°C. to −25°C., said second melt composition comprising 30 to 42% by weight substantially amorphous polypropylene, 20 to 30% by weight terpene resin, and 25 to 45% by weight essentially paraffinic oil; whereby a gel-like, thermoplastic, heterogeneous sealant member comprising a plurality of distinct layers of solid hot-melt composition is obtained, said second layer having a glass transition temperature in the range of −45°C. to −25°C., said heterogeneous sealant member being capable of providing a seal which can resist, at 24°C., a hydrostatic head in excess of 275 cm.

2. A method according to claim 1 wherein said first and second hot-melt compositions are hot-melt adhesives which are tacky at temperatures above 60°C., said second hot-melt composition being tacky at room temperature also, and wherein said second layer is the uppermost layer of said heterogeneous sealant member.

3. A method according to claim 1 wherein said second layer has a glass transition temperature of −45°C. to −35°C. and a penetration value, determined according to ASTM test D-217-T60 with a D-5 needle and 200 grams of weight for 5 seconds at 25°C., which is greater than 350 mm.

4. A method according to claim 3 wherein said first layer has a glass transition temperature below about −5°C. and a penetration value, determined according to said ASTM test under said conditions, which is less than 350 mm.

5. A method according to claim 4 wherein the properties of said first layer are:
 glass transition temperature: above −15°C.,
 ASTM D217-T60 penetration: less than 300 mm.,
 resistant to flow under the influence of gravity at temperatures below: 65°C.,
and wherein the properties of said second layer are:
 glass transition temperature: −43° to −40°C.,
 ASTM D217-T60 penetration: more than 400 mm.,
 resistant to flow under the influence of gravity at temperatures below: 65°C., 6. A method according to claim 4 wherein said first hot-melt composition consists essentially of:
 a. 55–65% by weight of substantially amorphous polypropylene with a molecular weight in the range of 2,000–20,000 and a softening point in the range of about 90°–105°C.,
 b. 15–25% by weight of a synthetic terpene resin,
 c. 15–25% by weight of a paraffinic oil.

7. A method according to claim 4 wherein said second hot-melt composition comprises:
 a. about 35–40% by weight of substantially amorphous polypropylene with a molecular weight within the range of 2,000–20,000 and a softening point in the range of about 90–105°C.,
 b. 25–30% by weight synthetic terpene resin, and
 c. 35–40% paraffinic oil 8. A method according to claim 2 wherein said major structural element is a concrete closure means.

9. A method according to claim 1 wherein said major structural element is a liner means for a concrete closure means.

10. The method comprising the following steps:
 I. Casting a concrete closure means for a burial vault and providing said closure means with a peripheral recess means around the underside thereof;
 II. Inverting said closure means whereby said recess means faces upwardly;
 III. Pouring into said recess means a first thermoplastic layer of essentially a first molten hot-melt composition consisting essentially of:
  a. 55–65% by weight of substantially amorphous polypropylene with a molecular weight in the range of 2,000–5,000 and a ball and ring softening point in the range of about 90°–115°C.,
  b. 15–25% by weight of a synthetic terpene resin which melts within the range of about 85°C. to about 105°C.; and
  c. 15–25% by weight of a paraffinic oil; said first hot-melt composition having a glass transition temperature within the range of −5° to −15°C., being substantially solid and resistant to flow under the influence of gravity at temperatures below 65°C., being pourable and capable of seeking its own level with the temperature range of 90° to about 110°C., and upon solidification, having a penetration value less than 300 mm. in 5 seconds at 25°C. in ASTM test D-217-T60, using a D-5 needle, and 200 grams of weight;
 IV. Permitting said first thermoplastic layer to cool to a temperature below 60°C. and to solidify to form a solid, gel-like layer with a generally planar upper surface;
 V. Pouring into said recess, on top of said generally planar surface, a second thermoplastic layer of essentially a second hot-melt composition consisting essentially of:
  a. about 35–40% by weight of said substantially amorphous polypropylene,
  b. 27–28% by weight of said synthetic terpene resin, and
  c. 37–38% by weight of said paraffin oil; said second hot-melt composition having a glass transition temperature within the range of about −43°C. to about −40°C. and a penetration value greater than 400 mm. in 5 seconds at 25°C. in ASTM test D-217-T60, using a D-5 needle and 200 grams of weight; and
 VI. Permitting said second thermoplastic layer to cool to room temperature, whereby said closure means is provided with a heterogeneous sealing element, formed in place within said recess, which sealing element is capable of providing a seal which can resist at least a 275 cm. hydrostatic head at 24°C.

11. In a method for providing a sealing element along the periphery of a closure means for a burial vault, the improvement which comprises:
I. Pouring into adherent contact with said periphery a first layer of essentially a first molten hot-melt composition comprising:
   a. 45–65% by weight of substantially amorphous polypropylene having a ball and ring softening point in the range of 90°–105°C.;
   b. 15–25% by weight of a terpene resin;
   c. 15–25% by weight of paraffinic oil;
II. Permitting said first layer to solidify;
III. Pouring into adherent contact with said first layer a second layer of essentially a second molten hot-melt composition comprising:
   a. 30–42% by weight of an atactic polypropylene having said ball and ring softening point,
   b. 20–30% by weight of a terpene resin, and
   c. 25–40% by weight of paraffinic oil.

12. A method according to claim 1 wherein said terpene resin is derived from a mixed olefin feed stock and a by-product of isoprene or polyisoprene production.

* * * * *